(12) United States Patent
Mitchell et al.

(10) Patent No.: US 7,137,594 B2
(45) Date of Patent: Nov. 21, 2006

(54) AIRCRAFT INTERIOR CONFIGURATION DETECTION SYSTEM

(75) Inventors: Bradley J. Mitchell, Snohomish, WA (US); Trevor M. Laib, Woodinville, WA (US); Kevin S. Callahan, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 247 days.

(21) Appl. No.: 10/710,287

(22) Filed: Jun. 30, 2004

(65) Prior Publication Data

US 2006/0032979 A1    Feb. 16, 2006

(51) Int. Cl.
*B64D 11/06* (2006.01)
(52) U.S. Cl. .................. 244/118.6; 297/217.3
(58) Field of Classification Search ............ 244/118.5, 244/118.6; 701/3; 297/217.3
See application file for complete search history.

(56) References Cited

U.S. PATENT DOCUMENTS

| 5,854,591 | A | 12/1998 | Atkinson |
| 6,453,267 | B1 | 9/2002 | Rudzik et al. |
| 6,578,795 | B1 | 6/2003 | Romca et al. |
| 6,690,659 | B1 | 2/2004 | Ahmed et al. |
| 2005/0178910 | A1* | 8/2005 | Sprenger .................. 244/118.6 |

* cited by examiner

*Primary Examiner*—Timothy D. Collins
(74) *Attorney, Agent, or Firm*—Ostrager Chong Flaherty & Broitman P.C.

(57) ABSTRACT

An interior cabin configuration determination system (10) includes multiple objects (16), including two or more monuments or passenger service units, that are within an interior cabin (13). The objects (16) include card readers (12). Object controllers (18) are coupled to the card readers (12) and determine the position of the objects (18) in response to the position information on the cards (12). A remotely located controller (20) determines the configuration of the objects (18) in response to the position information.

8 Claims, 5 Drawing Sheets

AIRCRAFT INTERIOR CONFIGURATION DETECTION SYSTEM

BACKGROUND OF INVENTION

The present invention is related generally to interior cabin configurations of an aircraft. More particularly, the present invention is related to a system for determining an existing interior cabin configuration of an aircraft.

Aircraft systems such as in-flight entertainment and cabin services often require the correlation of passenger seat location with the relative location of ancillary functions, such as reading lights or attendant call indicators. The illumination of an attendant call indicator, for example, allows airline cabin crewmembers to determine which passenger has requested service. The passenger seat and the ancillary functions are typically members of separate electronic systems, and are usually not physically connected to each other. Often, these separate systems coordinate the command signals issued from the seats with the control of their corresponding ancillary functions through use of a software database. This is also true of any monument in the passenger cabin where a command is issued by that monument, intending to control a separate function. The term "monuments" refers to any structure that is fastened to the floor of an interior cabin of an aircraft. Some examples of a monument are a passenger seat, a lavatory, and a partition.

Seats within an interior cabin of an aircraft are typically configured in columns. Each column is connected to a power line and a serial communication line. The serial communication line is connected between a central controller and a first or front seat. Additional serial communication lines are linked between the first seat and each adjacent seat in a particular column. Currently, each seat contains an identical electronic module and does not initially have an electronic address. When the seat modules are initially powered, a central controller issues an address to the first module in the seat column. This first module then sends the address associated with the first seat, incremented by one, to the next adjacent seat module in that column. This process repeats until all seat modules in that column have been assigned an address relative to a neighboring module. The address information for each seat is transmitted to a central controller via serial communication links between the seats. The inclusion of the serial communication lines increases system hardware complexity and costs.

Currently, the seat location databases are in essence manually created. The databases manually correlate seat positions with their corresponding ancillary functions. The central controller responsible for the seats receives commands from their subordinate seat modules. The central controller then issues a command to another separate central controller responsible for controlling the desired ancillary functions.

Although the central controllers correlate seat location based on seat order to determine an interior cabin configuration, neither controller is capable of determining the absolute position of each seat. The physical alignment of ceiling mounted passenger service items, such as reading lights, attendant call lights, air-conditioning controls, oxygen masks, etc. is performed manually. This alignment procedure is time consuming and error prone due to human intervention.

In addition, current aircraft are required to satisfy various stringent safety and operating requirements in various operating conditions. Thus, when an aircraft is altered, such as when a configuration of interior cabin monuments is changed, many aircraft systems are typically redemonstrated and reevaluated to prove satisfaction of these requirements. This redemonstration and reevaluation is time consuming and costly. It is therefore desirable to develop an aircraft system that can accommodate foreseeable modifications to monuments and passenger service units while maintaining satisfaction of the above-stated operating requirements.

Thus, there exists a need for an improved system for detecting a configuration of an interior cabin of an aircraft.

SUMMARY OF INVENTION

One embodiment of the present invention provides an interior cabin configuration determination system that includes multiple objects, including two or more monuments or passenger service units, which are within an interior cabin. The objects include card readers. Object controllers are coupled to the card readers and determine the position of the objects in response to the position information on the cards. A remotely located controller determines the configuration of the objects in response to the position information. The stated embodiment, as well as other embodiments of the present invention, is described in further detail below.

The embodiments of the present invention provide several advantages. One such advantage is the provision of wireless communication between a central controller and multiple monument controllers. This wireless communication allows for determination of an interior cabin configuration with minimal use of communication lines or cables.

Another advantage provided by an embodiment of the present invention is the provision of interior cabin monuments having associated card readers for direct position determination without the use of wired or wireless communication to a remote controller. These cards can also provide a visual indication to the passenger or cabin attendant of the address of that monument. This provides a simple, quick, and direct technique for determining monument position information.

Yet another advantage provided by an embodiment of the present invention is the provision of each monument within an interior cabin being in wireless communication with each other and a main controller. Each monument within a particular column has a transmitter and a receiver that are in wireless communication with adjacent monuments in that column for transferring position information between the monuments. This wireless communication simplifies system physical complexity and allows for ease in reconfiguring the monuments of an interior cabin. Wireless communication of monuments and a main controller also allows for the reconfiguration of monuments without the rewiring of monuments and the redemonstrating and reevaluating of monument related systems.

Furthermore, another advantage provided by an embodiment of the present invention is the provision of transmitting a position determinative signal across multiple monuments, the monuments determining position thereof relative to a reference point. This allows for actual position determination in addition to the determination of the relative arrangement of monuments. This also allows for actual position determination relative to interior cabin amenities.

The present invention itself, together with further objects and attendant advantages, will be best understood by reference to the following detailed description, taken in conjunction with the accompanying drawing.

DETAILED DESCRIPTION

Figure 1:
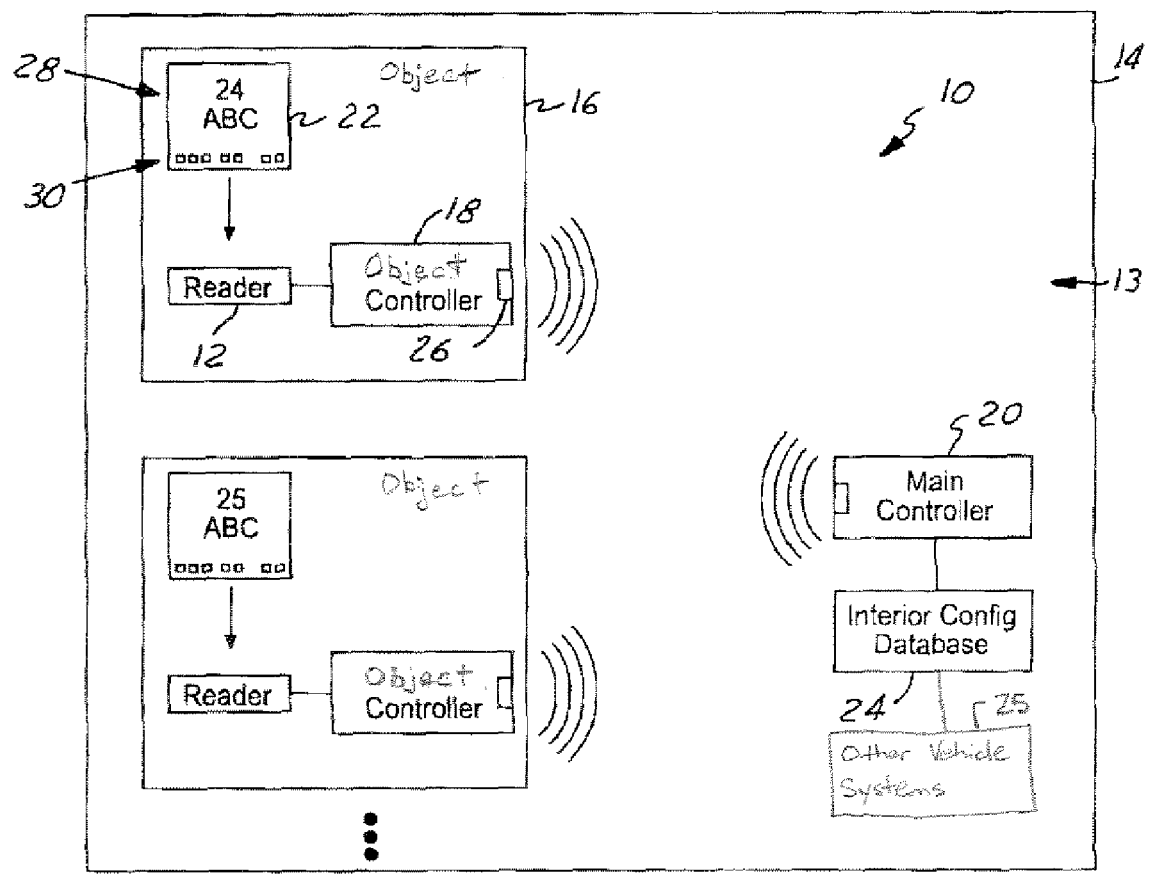
FIG. 1 is a block diagrammatic view of an interior cabin configuration determination system incorporating object card readers in accordance with an embodiment of the present invention.

In the following Figures the same reference numerals will be used to refer to the same components. While the present invention is described primarily with respect to systems for determining interior cabin configurations of an aircraft, the present invention may be adapted and applied in various vehicle and non-vehicle applications. The present invention may be applied in aeronautical applications, nautical applications, railway applications, automotive vehicle applications, and commercial and residential applications, as well as in other applications where monuments are utilized and the positions thereof are desired.

In the following description, various operating parameters and components are described for one constructed embodiment. These specific parameters and components are included as examples and are not meant to be limiting.

Figure 4:
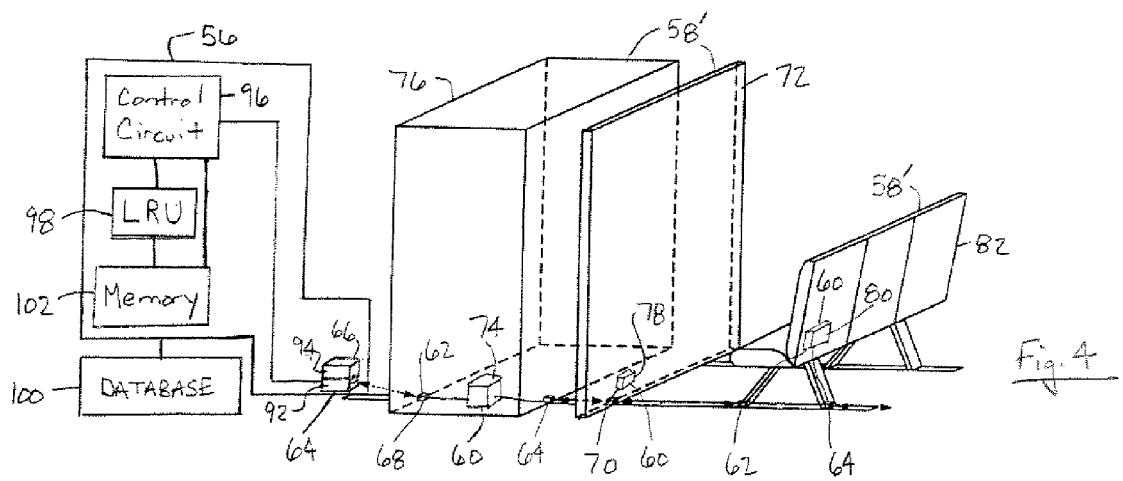
FIG. 4 is a perspective and block diagrammatic view of a portion of the interior cabin configuration determination system of FIG. 3.

Also, in the following description the term "monument" refers to any structure that may be secured to a floor of a vehicle. A monument may for example be in the form of a seat, a lavatory, or a partition, as are shown in FIG. 4. A monument may also include other structures known in the art, such as a closet or a galley service table, which may be fastened to the floor of a vehicle. Monuments arrangements or floor plans within a vehicle may be reconfigured.

Additionally the term "configuration" as used with respect to the monuments of a vehicle refers to the floor plan or layout of the monuments and the types and styles of each monument. The configuration of the monuments within a vehicle includes the position of the monument relative to each other and may also include the position of the monuments relative to a reference point. For example a system may have knowledge of the relative placement or arrangement of seat A relative to seat B and seat C. The system may also have additional information that includes the actual distances between the seats and the actual position of the seats relative to a fixed point. The configuration of the monuments may also include the form, arrangement, or state of each particular monument. For example, knowledge of whether a monument is stowed or deployed may be included.

Furthermore, the term "passenger service unit" refers to any line replaceable unit typically located above passenger seats or in aircraft overhead areas to provide items, services, or functions, such as emergency oxygen, reading lights, gasper air supply nozzles, passenger information signs, video display monitors, and attendant call buttons.

Moreover, the term "object" refers to any vehicle interior cabin structure or item where knowledge of the position of that structure or item is desired. An object position may be reconfigured (have a different location within a vehicle) relative to other objects within a vehicle. An object may refer to a monument, a passenger service unit, or other structure or item known in the art.

Figure 2:
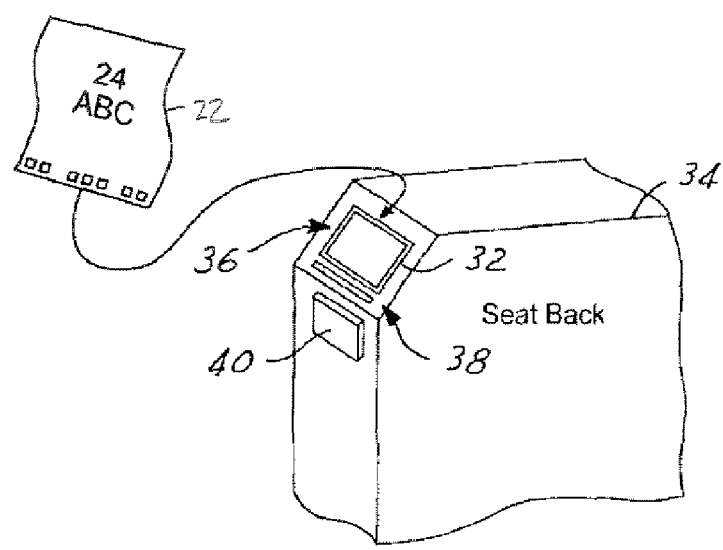
FIG. 2 is a perspective view of a portion of the interior cabin configuration determination system of FIG. 1.

Referring now to FIGS. 1 and 2, a block diagrammatic view and a perspective view of an interior cabin configuration determination system 10 incorporating object card readers 12 within an interior cabin 13 of a vehicle 14 are shown in accordance with an embodiment of the present invention. The configuration system 10 includes multiple objects 16 that each have an object controller 18. The object controllers 18 may each be in communication with a central or main controller 20 as shown, or a designated controller may be selected from the object controllers 18 for sole communication with the main controller 20. The object controllers 18 provide identification and location or position information to the main controller 20. The object controllers 18 are coupled to the readers 12, which read the cards 22 to retrieve object position information therefrom. The main controller 20 stores the identification and position information in an interior configuration database 24. The main controller 20 determines the configuration of the objects 16 from the stated identification and position information. The objects 16 may be in the form of monuments or passenger service units.

The readers 12 may include an array of phototransistors (not shown) for the detection of light patterns illuminated through or reflected off the cards 22. The readers 12 may also include micro switches (not shown), which may be used in replacement or in addition to the phototransistors. The micro switches may be used to detect notches or holes in the cards 22. The readers 12 decipher the encrypted formats on the cards to determine the position of the associated monument. This is described in further detail below.

The object controllers 18 and the main controller 20 each have transceivers 26 for the wireless communication therebetween. The object controllers 18 and the main controller 20 may be microprocessor based such as a computer having a central processing unit, memory (RAM and/or ROM), and associated input and output buses. The object controllers 18 and the main controller 20 may be in the form of an application-specific integrated circuit or may be formed of other logic devices known in the art. The main controller 20 may be in the form of or a portion of a line replaceable unit or a central vehicle main control unit.

The cards 22 may be in various formats. The cards 22 are designed to provide position determinative information in both visual and encrypted formats. The cards 22 include a card visual portion 28 and a card encrypted portion 30. The cards 22 may be inserted into a backlit card holder/display 32 on the side of a seat 34, as shown in FIG. 2. The card display 32 has a holder visual portion 36 and a holder encrypted portion 38 that correspond with the card portions 28 and 30. The cards 22 may have row numbers, seat numbers, and other monument related information known in the art.

The card visual portions 28 aid passengers and crewmembers in finding objects. For example, passengers may view the card displays 32 during boarding of the vehicle 14 in order to locate their assigned seats. The card-encrypted portions 30 may be in the form of dots along the edges of the cards 22, as shown, or may be in some other format known in the art. The card encrypted portions 30 may be hidden when inserted into the card display 32. The card encrypted portions 30 may be read by the phototransistors of the readers 12.

When the cards 22 are opaque, the holder visual portions 32 may not be backlit. A hidden light source 40 may be used to illuminate the card encrypted portions 30 and not the card visual portions 28. The card-encrypted portions 30 may be in the form of notches or holes in the edges of the cards 22, as suggested above.

The cards 22 may be formed of plastic or transparent material, or may be formed of some other material known in the art. When the cards 22 are in the form of transparencies, the position determinative information may be printed on the transparencies using a common office printer, such as an inkjet printer or a laser printer.

The cards 22 may also include a series of conductive traces (not shown), which are selectively distributed across a portion of the cards 22 and have an encoded row and/or seat number contained thereon. Electrical brushes in the readers 12 sense whether the traces are broken or not broken to determine the row numbers and the object numbers of the objects 16.

When the vehicle 14 is operating in a maintenance mode a radio frequency signal may be transmitted by the main controller 20 to the object controllers 18 to request that each object 16 provide object related information including identification and position information. The object information may include IP addresses, row numbers, column numbers, seat numbers, seat grouping type, vehicle zone, bulkhead information, distance between objects, and other related information. "Vehicle zone" refers to an area within a passenger cabin. Vehicle zones may be identified by letters "A", "B", "C", etc. down the length of the vehicle, for example, from the head to the stern of an aircraft, with each zone including the space between exit door pairs (or ends of a cabin). Seat grouping type refers to whether seats are grouped in pairs, triplets, or in some other grouping. When the radio signal is received by one of the object controllers 18, object related information pertaining to or associated with that object is reported by that controller to the main controller 20.

The configuration system 10 allows for automatic determination and storage of object configurations in the database 24, which is then available for use by other vehicle systems 25, such as other electronic control systems. The use of the cards 22 avoids the permanent or fixing of numbers into an object assembly during production thereof. The visual and encrypted formats of the cards 22 may be in various colors. The encrypted formats may be in various encoded patterns.

The object controllers 18 may report the object related information to the main controller 20 upon receiving power. The main controller 20 may accept reception of the stated information when in a maintenance mode and may ignore or not accept the information otherwise.

Figure 3:
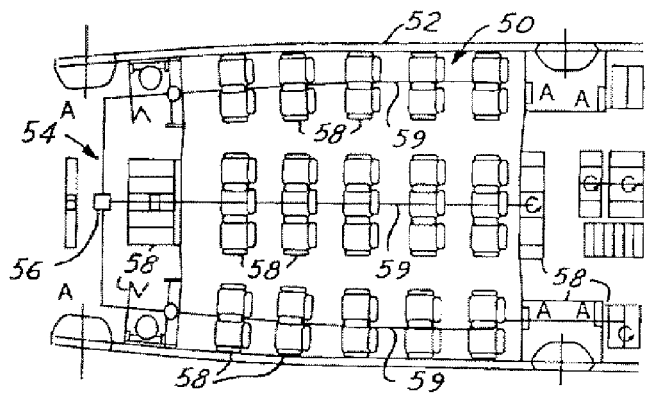
FIG. 3 is a top view of a sample interior cabin of an aircraft illustrating the incorporation of an interior cabin configuration determination system in accordance with another embodiment of the present invention.

Referring now to FIGS. 3 and 4, a top view of an interior cabin 50 of an aircraft 52 and a perspective and block diagrammatic view of a portion of that interior cabin 50 illustrating the incorporation of an interior cabin configuration determination system 54 in accordance with another embodiment of the present invention is shown. The configuration system 54 includes an initiating device 56, which may be in the form of a main controller, and multiple "stringed" monuments 58" arranged in columns. Each monument 58" has a monument controller 60 and a forward directed transceiver 62 and a rearward directed transceiver 64, which are best seen in FIG. 4. Identification and position information is wirelessly transmitted between the initiating device 56 and the monuments 58 utilizing a relay or daisy chain or tokening technique.

The monuments 58" are linked via power lines 59. The power lines 59 may extend between interior cabin zones of the aircraft 52. The monuments 58" may be arranged in any number of columns and rows or in some other format known in the art.

The transceivers 62 and 64 may be infrared, ultrasonic, or radio frequency based. The forward directed transceivers 62 are in-line with and directed at the rearward directed transceivers 64, such that signals between adjacent transceivers are not received by other or non-adjacent transceivers, thus avoiding cross talk. For example, a first transceiver 66 transmits a position determinative signal to a second transceiver 68. The second transceiver 68 receives that position determinative signal, which is undetected by the remaining transceivers that are located aft of the second transceiver 68. Thus, each of the transceivers 62 and 64 is positioned and has a narrow field-of-view such that they are in communication with a single transceiver. The transceivers 62 are in a position altering arrangement with the transceivers 64. The transceivers 62 are directed 180° from the transceivers 64.

The transceivers 62 and 64 may be separate devices or may be part of a single unit as is shown by transceiver 70 of partition 72. The transceivers 62 and 64 may be utilized to determine distances between the monuments 58". This aids in the determination of the actual position of a monument relative to a fixed or reference point within the aircraft 52.

In operation, when infrared or ultrasonic transceivers are utilized, the initiating device 56 initiates the configuration process by requesting identification and position information from a first monument controller, such as monument controller 74 of lavatory 76. The first monument controller 74 in response thereto transmits identification information pertaining to the lavatory 76 to the initiating device 56 and requests identification information from the second monument controller 78 of the partition 72. Any communications between the first controller 74 and the second controller 78 may be transferred to the initiating device 56. In a similar manner the second controller 78 sends partition identification information to the first controller 74 and requests identification information from a third monument controller 80 of seat system 82. This process continues until the last monument controller within a chain or column is reached. When the last monument controller "times out" due to lack of reception of identification information from a non-existent controller for a predetermined period of time the last controller signals the initiating device 56 of such time out or lack of reply. The last controller may signal the initiating device 56 directly or via the preceding monument controllers, such as controllers 74, 78, and 80 that the last controller has been reached.

When radio frequency transceivers are utilized or additional radio frequency transceivers are utilized in combination with infrared or ultrasonic transceivers the above requested identification information, as well as the position information, may be directly transmitted to the initiating device 56 from each monument 58". For example, the initiating device 56 may send an infrared identification request signal to the first monument or lavatory 76 within the string of monuments 58". The first monument 76 may then in response thereto send the identification information pertaining to that monument directly over radio frequency to the initiating device 56. The first controller 74 upon the lapse of a predetermined time interval or upon receiving a confirmation that the associated identification information has been received by the initiating device 56 may then signal, via infrared or ultrasonic transmission, a request to the second or adjacent monument controller 78 to provide identification information pertaining to the second monument 72 to the initiating device 56. Again this process is repeated until there are no monument identifications received by the initiating device 56 for a set time period or until the last monument within the string of monuments 58" identifies itself as such.

The initiating device 56 may for example include a transceiver, such as the first transceiver 66 having a transmitter 92 and a receiver 94, and a control circuit 96. Data is passed from the control circuit 96 to a core line replaceable unit 98 that compiles the data into an interior configuration database 100. The initiating device 56 may also include a memory 102 that stores the data for later download to the line replaceable unit 98. The control circuit 96 and the memory 102 may be part of the line replaceable unit 98. The initiating device 56 may be fixed on the aircraft 52 or be an integral part of the first monument 76.

The initiating device 56 may also be in the form of a portable unit that is temporarily located at various locations along the string of monuments 58". In one example embodiment of the present invention, the initiating device 56 is located at the front or rear of a string of monuments 58", as to precede the first monument 76 within the string or to be subsequent to the last monument within the string.

The last monument controller may be programmed such that it contains knowledge of being the last monument within a string. This allows the last controller to proceed without waiting the predetermined period of time to timeout. A switch, jumper, or similar mechanism (not shown) may be applied to the rearward facing transceiver of the last monument to manually set the last monument such that it recognizes and is able to identify itself as the last monument.

Figure 5:
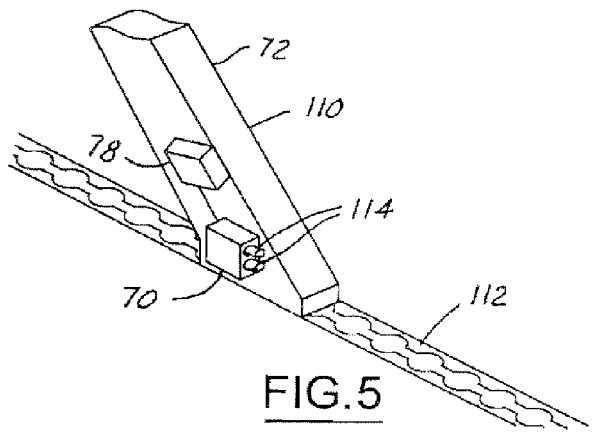
FIG. 5 is a perspective close-up view of a seat leg incorporating a transceiver in accordance with another embodiment of the present invention.

The monument controllers 60 and transceivers 62 and 64 may be in various locations within the monuments 58". One such example is shown in FIG. 5. The monument controllers 60 and transceivers 62 and 64 may be located within a seat leg 110 above a seat track 112, as is illustrated by the monument controller 78 and transceiver 70. When infrared transceivers are utilized as shown, the light emitted and received therefrom may be transmitted through the viewing angle shields 114 or light guides (not shown). The light guides may be formed of a clear plastic, may be hollow, and may be formed as part of a seat track cover. The monument controller 78 and transceiver 70 may be an integral part of the monument 72 or may be separately attached devices.

The information or data transferred between each monument 58" and to and from the initiating device 56 may include IP addresses, built in test equipment data, monument types, row numbers, column numbers, seat numbers, seat grouping types, airplane zones, bulkhead information, distance between monuments, and other related information known in the art, as with the system 10 of FIGS. 1 and 2. Seat grouping type refers to the number of seats within a given monument.

Figure 6:
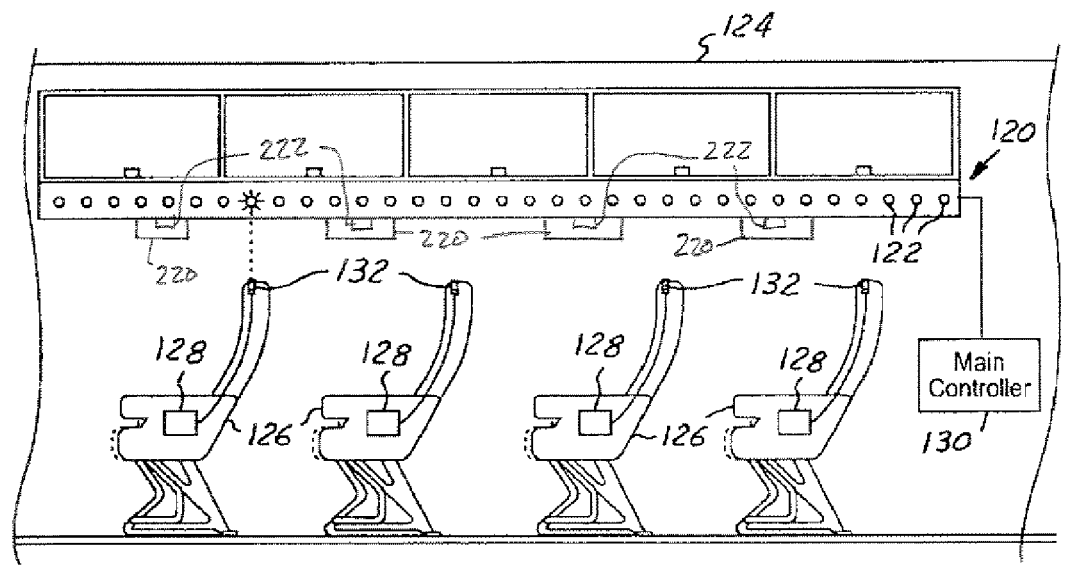
FIG. 6 is a side view of an interior cabin configuration determination system incorporating the use of a series of position determinative illumination devices in accordance with another embodiment of the present invention.

Referring now to FIG. 6, a side view of an interior cabin configuration determination system 120 incorporating the use of a series of position determinative illumination devices 122 in accordance with another embodiment of the present invention is shown. The illumination devices 122 are positioned at predetermined intervals along the length of the aircraft 124 and along the monuments 126. An illumination signal is transmitted across the illumination devices 122. The illumination devices 122 are illuminated in series at a known frequency. As each illumination device 122 is temporarily illuminated, the monument controllers 128 report the associated location of the monuments 126 wirelessly or otherwise to a main controller 130.

Each illumination detector or receiver 132 is mounted on one of the monuments 126 and detects light emitted from a light source in line with that receiver 132. For example, in the embodiment as illustrated, the illumination devices 122 are located above a column of seats. As the illumination devices 122 are illuminated the receivers 132 detect light emitted from the illumination devices 122 directly above the receivers 132 and generate indication signals or illumination detection signals. The monument controllers 128 within the monuments 126 then signal the main controller 130 of such detection in response to the illumination detection signals. The main controller 130 determines the configuration of the monuments 126 using known positions of the illumination devices 122, the illumination frequency and timing of the illumination devices 122, and the timing of the illumination detection signals. The main controller 130 may also determine position in response to the detected magnitude of the light detected from the illumination devices 122.

The illumination devices 122 may be in the form of a light strip, a series of LEDs, a series of light bulbs, a series of mood lights, a light guide, a series of lasers, or in some other form known in the art. The illumination devices 122 may be in various locations relative to the monuments 126.

The receivers 132 detect the magnitude of the light emitted by adjacent light sources. The viewing angle of the receivers 132 and/or the illumination devices 122 is controlled to ensure alignment of the receivers 132 with adjacent illumination devices 122. The receivers 132 may be of various types known in the art for reception of light. The receivers 132 may be located anywhere in or on the monuments 126 such that they are able to detect light emitted from a particular light source within the series of illumination devices 122.

Figure 7:
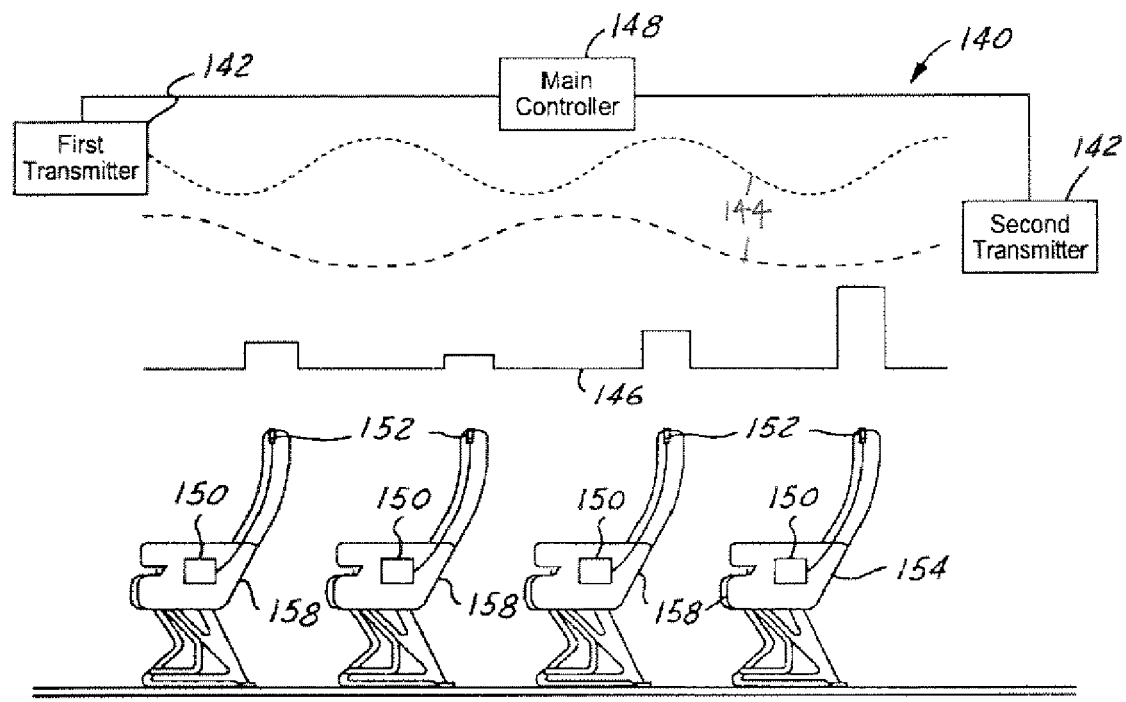
FIG. 7 is a side view of an interior cabin configuration determination system incorporating the use of a pair of radio frequency interference transmitters in accordance with another embodiment of the present invention.

Referring now to FIG. 7, a side view of an interior cabin configuration determination system 140 incorporating the use of a pair of radio frequency interference transmitters 142 in accordance with another embodiment of the present invention is shown. The interference transmitters 142 transmit radio frequency signals 144 that interfere with each other and form a resultant signal 146. A main controller 148 that is coupled to the interference transmitters 142 determines at any given time the approximate location of the point of maximum constructive interference. The monument controllers 150 detect magnitude of the result signal 146. The main controller 148 compares a maximum constructive interference value with the detected magnitudes of the resultant signal 146. The receivers 152 generate indication signals in response to the detected resultant signal. The receivers 152 that report an indication signals a reception magnitude that is approximately the same as the maximum constructive interference value is then determined to be located at the point of maximum constructive interference. Monument 154 is shown as being positioned at the point of maximum constructive interference.

The main controller 148 may also monitor points of minimum destructive interference or patterns of interference magnitudes to determine positions of the monuments. Thus, the position of each of the monuments 158 is determined as a function of the wavelength at the time that the monuments 158 report the interference measured. The monument controllers 150 may directly determine their position and then report that position to the main controller 148 using the above stated monument related information. The monument controllers 150 may receive transmitter frequencies and timing from the main controller 148.

The interfering radio frequencies 144 in FIG. 7 may be replaced with sound waves or vibrations. Alternatively, a sound may be generated from known points within the cabin, for example cabin passenger address speakers. The sensors 152 may perform as microphones at each monument and be used to determine the intensity and/or detection time of the sound waves, and report this to the main controller 148 by wireless or other known techniques. The main controller 148 may then in response to the intensities and detection time to determine the location of each monument 158 by triangulation.

The embodiments of FIGS. 6 and 7 allow for the actual position determination of the monuments 126 and 158. The position of the monuments 126 and 158 may be determined relative to a reference point and/or relative to various vehicle interior cabin amenities, such as a reading light, an air conditioning control, a call button, an oxygen supply device, a overhead compartment, or some other amenity known in the art.

Figure 8:
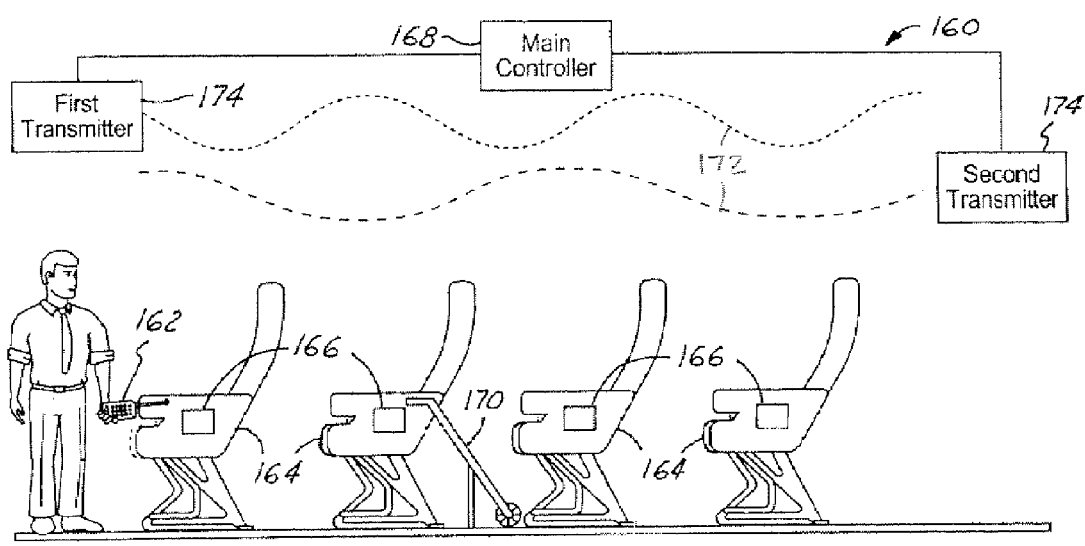
FIG. 8 is a side view of an interior cabin configuration determination system illustrating the use of a hand-held device for position determination in accordance with another embodiment of the present invention.

Referring now to FIG. 8, a side view of an interior cabin configuration determination system 160 illustrating the use of a hand-held device 162 for position determination in accordance with another embodiment of the present invention is shown. The hand-held device 162 has knowledge of its actual position and thus when held near a monument can determine position of that monument. In operation, the hand-held device 162 is positioned near each monument 164, receives identification information from each monument controller 166, and reports to a main controller 168 the identification information and position for each monument 164.

The hand-held device 162 may be in the form of a global positioning unit, a radio frequency interference receiver, or a laser range finding unit. The hand-held device 162 may also be in the form of a distance measuring wheel, or may be in some other form known in the art. A freestanding distance measuring wheel 170 is shown. In one embodiment of the present invention, the hand-held device 162 detects interference between radio waves 172 via transmitters 174, as described with respect to the embodiment of FIG. 7, to determine position thereof.

The identification of each monument 164 may be wirelessly transmitted from each monument 164 to the handheld device 160 or by some other method. The identification information may be transmitted via radio waves, infrared light, or ultrasonic waves. The identification information may be barcode scanned into the hand-held device 160, transmitted to the hand-held device 160 via a short-range radio frequency identification tag imbedded in the monument 164, transmitted via electrical contacts between the monuments 164 and the hand-held device 160, visually read and manually entered into the handheld device 160, or determined using some other technique known in the art.

Figure 9:
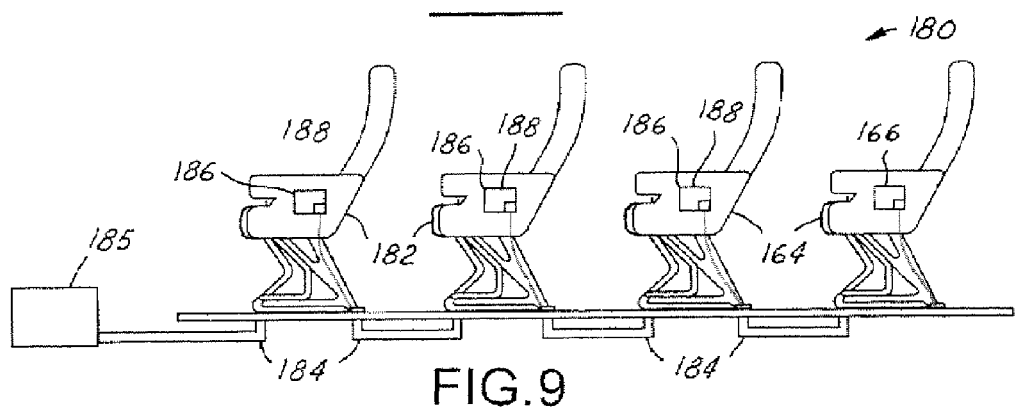
FIG. 9 is a side view of a smart wire interior cabin configuration determination system in accordance with another embodiment of the present invention.

Referring now to FIG. 9, a side view of a "smart wire" interior cabin configuration determination system 180 in accordance with another embodiment of the present invention is shown. The term "smart wire" refers to wire fault-detection systems, known to the art, which can determine the length of a wire, or the location of a break in that wire. The smart wire system 180 determines monument location via power line communication. The monuments 182 are daisy-chained together with a set of power lines 184. Wire length determination techniques known in the art are utilized to determine the approximate distances between the monuments 182. As with the embodiments of FIGS. 3 and 4, position information is relayed between the monuments 182. The position information is relayed via the power lines 184 or by using infrared, ultrasonic, or radio frequency transceivers to and from the initiating device 185 and between the monument control circuits 186. The monument control circuits 186 may include filters 188 for detecting particular frequencies associated with monument information signals transmitted across the power lines. The filters 188 may be hardware or software based. Each monument 182 may have the same carrier frequency associated therewith, but have a different assigned pulse code modulated frequency.

Figure 10:
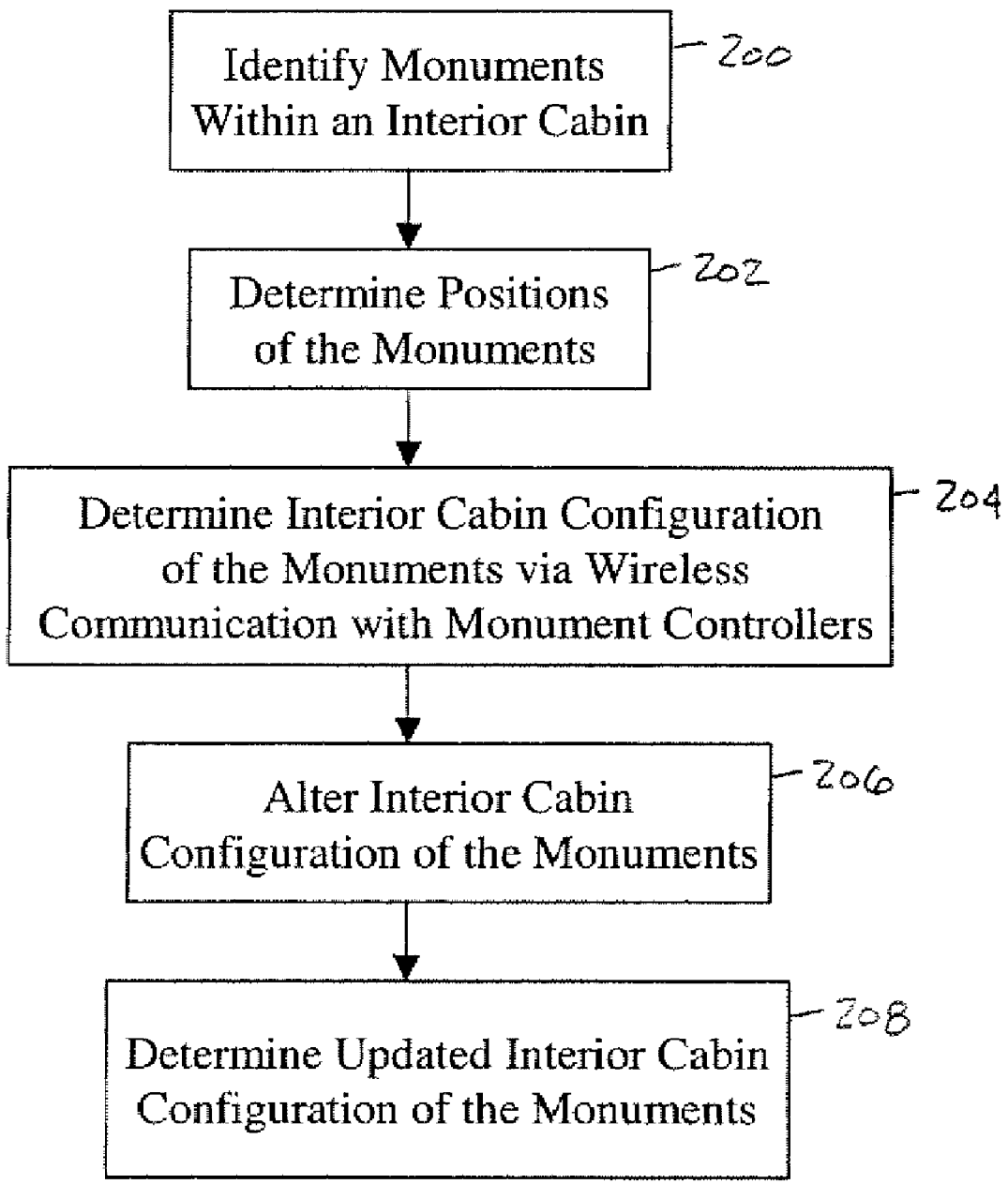
FIG. 10 is a logic flow diagram illustrating a method of determining an interior cabin configuration of multiple objects located therein in accordance with another embodiment of the present invention.

Referring now to FIG. 10, a logic flow diagram illustrating a method of determining an interior cabin configuration of multiple monuments located therein is shown in accordance with multiple embodiments of the present invention.

In step 200, the monuments are identified. Identification of the monuments may be requested via infrared, ultrasonic, or radio wave frequencies from the monuments using a relay or daisy-chain technique, via a hand-held device, or via a smart wire, as described above.

In step 202, positions of the monuments are determined via wireless communication or through the use of a smart wire configuration determination system. A remotely located controller, such as the main controllers or the initiating devices 20, 56, 96, 130, 148, 168, and 185 determines relative arrangement of the monuments, as well as the actual position of the monuments relative to a reference point. The reference point may be located anywhere on a vehicle.

In step 204, the interior cabin configuration is determined in response to the identification and position information. A main controller, an initiating device, a monument controller, or a hand-held device determines the configuration of the monuments utilizing the identification and position information determined in steps 200 and 202.

In step 206, the configuration of the monuments may be altered. The monuments may be rearranged, new monuments may be installed, and existing monuments may be removed. The main controller or other controller may detect such change and request updated identification and position information from each of the monuments. The altered or newly installed monuments may initiate or report updated identification and position information upon installation thereof to the appropriate controller for configuration determination.

In step 208, the main controller, the initiating device, the monument controller, or the hand-held device may determine the configuration of the monuments utilizing the updated information of step 206.

The above-described steps are meant to be illustrative examples; the steps may be performed sequentially, synchronously, simultaneously, or in a different order depending upon the application.

The monument configuration determination systems, techniques, and methods described above with respect to FIGS. 3–10, although described with respect to monuments may also be applied to other objects, such as passenger service units. The passenger service units may include object controllers, similar to the monument controllers and may be in communication with the main controllers 130, 148, 168, the initiating device 185, the hand-held device 162, the illumination devices 122, and the adjacent monument or object controllers 128, 150, 166, and 186 as described in the embodiments above. For example, passenger service units 220 may be located over the monuments 126 of FIG. 6 and include object controllers 222 that perform similarly to that of the monument controllers 128. Also, the above-described configuration systems 10, 54, 120, 140, 160, and 180 may be used to locate each passenger service unit individually as an offset from its associated seat or monument, or vice versa.

The present invention provides monument configuration determination systems and techniques that allow for quick systematic determination of interior cabin monument configurations. The systems simple in design and inexpensive to implement due to the reduction in cabling. The systems allow for the reconfiguring of an interior cabin without the need to necessarily redemonstrate and reevaluate a vehicle in various operating conditions.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

The invention claimed is:

1. An interior cabin configuration determination system comprising:

a plurality of objects selected from a plurality of monuments and a plurality of passenger service units within an interior cabin and comprising a plurality of card readers;

a plurality of object controllers coupled to said plurality of card readers and determining position of said plurality of objects in response to position information on a plurality of cards; and a remotely located controller determining a configuration of said plurality of objects in response to said position information.

2. A system as in claim 1 wherein said plurality of cards comprise seat position information in a visual format.

3. A system as in claim 1 wherein said plurality of card readers comprise a backlit visual display for displaying said position information.

4. A system as in claim 1 wherein said plurality of cards comprise said position information in an encrypted format, said plurality of card readers deciphering said encrypted format to determine position of said plurality of monuments.

5. A system as in claim 1 further comprising:

a main transceiver transmitting an object information request signal; and at least one object transceiver coupled to said plurality of card readers and transmitting at least one object information signal to said remotely located controller.

6. A system as in claim 5 wherein said at least one object information signal comprises object information selected from at least one of IP address, row number, column number, seat number, seat grouping type, airplane zone, and bulkhead information.

7. A system as in claim 1 wherein said plurality of object controllers are in wireless communication with said remotely located controller.

8. A system as in claim 1 wherein said remotely located controller is a line replaceable unit.

* * * * *